US010948365B2

(12) United States Patent
Fox et al.

(10) Patent No.: US 10,948,365 B2
(45) Date of Patent: Mar. 16, 2021

(54) FORCE BALANCE SENSOR AND METHOD THEREFOR (71) Applicant: The Boeing Company, Chicago, IL (US)

(72) Inventors: Michael Thomas Fox, St. Charles, MO (US); Eric Anton Howell, Ballwin, MO (US); Jeffrey Michael Roach, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 15/881,237

(22) Filed: Jan. 26, 2018

(65) Prior Publication Data

US 2019/0234813 A1 Aug. 1, 2019

(51) Int. Cl.
*G01L 1/04* (2006.01)
*F15B 11/22* (2006.01)
(Continued)

(52) U.S. Cl.
CPC .............. *G01L 1/048* (2013.01); *B64C 13/02* (2013.01); *B64C 13/24* (2013.01); *F15B 11/22* (2013.01); *G01L 1/22* (2013.01); *G01L 1/2268* (2013.01); *G01L 3/10* (2013.01); *G01L 3/108* (2013.01); *G01L 5/0071* (2013.01); *F15B 2211/6336* (2013.01); *F15B 2211/7107* (2013.01); *F15B 2211/76* (2013.01); *F15B 2211/782* (2013.01)

(58) Field of Classification Search
CPC ..... G01L 1/048; G01L 1/2218; G01L 1/2268; G01L 3/108; G01L 5/0071; G01L 1/2225; G01L 1/2231; G01L 1/2275; F15B 11/22; F15B 11/161; B64C 13/24
See application file for complete search history.

(56) References Cited

U.S. PATENT DOCUMENTS 3,555,894 A * 1/1971 Bratkowski ............ G01H 11/06
340/870.39
3,576,302 A * 4/1971 Palfreyman ........... B64C 13/044
244/236
(Continued)

FOREIGN PATENT DOCUMENTS

EP 3255287 12/2017
JP H01312203 12/1989

OTHER PUBLICATIONS

Extended European Search Report, European Application No. 19153771, dated Oct. 11, 2019.
(Continued)

*Primary Examiner* — Christopher D Hutchens
(74) *Attorney, Agent, or Firm* — Perman & Green LLP (57) ABSTRACT

A force balance sensor including a mechanical strain amplification system including a sensor torsion member having a first end and a second end spaced from one another along a longitudinal axis of the sensor torsion member, at least one strain sensor coupled to the sensor torsion member between the first and second ends, a first torsional stiffening member coupled to the first end of the sensor torsion member, and a second torsional stiffening member coupled to the second end of the sensor torsion member, wherein the first torsional stiffening member and the second torsional stiffening member are coupled to a torque member.

22 Claims, 8 Drawing Sheets

(51) Int. Cl.
*B64C 13/24* (2006.01)
*G01L 5/00* (2006.01)
*G01L 3/10* (2006.01)
*B64C 13/02* (2006.01)
*G01L 1/22* (2006.01)

(56) References Cited

U.S. PATENT DOCUMENTS

| | | | |
|---|---|---|---|
| 3,672,213 A | 6/1972 | Watson | |
| 3,717,029 A * | 2/1973 | Tveter | G01L 3/108 |
| | | | 74/136 |
| 4,779,822 A * | 10/1988 | Burandt | B64C 13/341 |
| | | | 244/99.9 |
| 4,780,671 A | 10/1988 | Hase et al. | |
| 4,800,798 A | 1/1989 | Boldrin et al. | |
| 4,825,748 A * | 5/1989 | Sheng | F15B 11/22 |
| | | | 91/171 |
| 4,876,895 A * | 10/1989 | Kao | E02D 1/00 |
| | | | 73/761 |
| 8,245,967 B2 * | 8/2012 | Kirkland | B64C 13/503 |
| | | | 244/76 R |
| 8,991,267 B1 * | 3/2015 | Kenney | G01L 3/10 |
| | | | 73/862.338 |
| 9,771,144 B2 * | 9/2017 | Dege | B64C 9/02 |
| 10,288,502 B1 * | 5/2019 | Ankney | B64F 5/60 |
| 10,589,871 B2 * | 3/2020 | Harrington | G07C 5/085 |
| 2006/0113933 A1 * | 6/2006 | Blanding | B64C 13/24 |
| | | | 318/116 |
| 2006/0179958 A1 * | 8/2006 | Ohta | G01L 1/2293 |
| | | | 73/862.045 |
| 2009/0007696 A1 * | 1/2009 | Morimoto | G01L 1/2218 |
| | | | 73/862.045 |
| 2009/0302516 A1 * | 12/2009 | Steele | B64C 13/505 |
| | | | 267/140.15 |
| 2014/0216173 A1 | 8/2014 | Chana | |
| 2017/0110993 A1 * | 4/2017 | Hamel | H04B 5/0031 |
| 2018/0142711 A1 | 5/2018 | Brewer et al. | |
| 2019/0061531 A1 * | 2/2019 | Harrington | B60L 7/18 |

OTHER PUBLICATIONS

Partial European Search Report, European Application No. 19153771, dated May 21, 2019.

* cited by examiner

FORCE BALANCE SENSOR AND METHOD THEREFOR

BACKGROUND

1. Field

The exemplary embodiments generally relate to force balance sensors and in particular to force balance sensors for flight control surfaces.

2. Brief Description of Related Developments

Generally, flight control surfaces are operated by two actuators disposed on either side of the flight control surface. The actuators are driven by a controller and commanded by the controller to substantially the same position to adjust the positioning of the flight control surface. When calibrating and/or installing the actuators, small variations between the two actuators may result in a slight position difference between the two actuators causing a possible flight control surface position error.

Additionally, even in the event the actuators assume their position perfectly, installation variations such as horn radius length variations between the two actuators may present a torque difference (also known as force fight) between the two flight control surface ends, and therefore a force difference on the actuators. This force difference on the actuators is difficult to address through calibration. Generally, this difference in force is supported by a torque placed on the flight control surface which induces a load that may impact the service life of the flight control surface.

A conventional approach to force fight is based on the use of multiple pressure sensors sensing a pressure produced by the two actuators. The pressure sensors are placed so as to sense a pressure differential across a respective actuator. In some systems, in order to achieve triple redundant sensing (i.e., the use of three functionally equivalent units to provide redundant backup), e.g., 12 individual pressure transducers/sensors and the associated signal processing electronics are utilized on the actuators to determine force balance error between the actuators. The use of multiple sensors, in some instances, may increase the force difference and create a counterproductive result.

In another conventional approach, a torque sensor is placed in series between each horn and the torsion bar. There is generally a torque sensor for each actuator, each of which produces a sensor signal for determining force balance error between the actuators. Placing the torque sensors in series with the horns and torsion bar (i.e., in the load path of the torsion bar) may compromise the stiffness of the torsion bar and effectively reduce the stiffness of the torsion bar to the stiffness of the torque sensors.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a force balance sensor including a mechanical strain amplification system including a sensor torsion member having a first end and a second end spaced from one another along a longitudinal axis of the sensor torsion member, at least one strain sensor coupled to the sensor torsion member between the first and second ends, a first torsional stiffening member coupled to the first end of the sensor torsion member, and a second torsional stiffening member coupled to the second end of the sensor torsion member, wherein the first torsional stiffening member and the second torsional stiffening member are coupled to a torque member.

Another example of the subject matter according to the present disclosure relates to an aircraft including an airframe, a control surface having a control surface frame pivotally coupled to the airframe with a torque member, a first actuator coupled to the first end and being configured to pivot the control surface about the longitudinal axis, a second actuator coupled to the second end and being configured to pivot the control surface about the longitudinal axis, a force balance sensor including a mechanical strain amplification system including a sensor torsion member having a first end and a second end spaced from one another along a longitudinal axis of the sensor torsion member, at least one strain sensor coupled to the sensor torsion member between the first and second ends, a first torsional stiffening member coupled to the first end of the sensor torsion member, and a second torsional stiffening member coupled to the second end of the sensor torsion member, wherein the first torsional stiffening member and the second torsional stiffening member are coupled to the torque member of the control surface.

Still another example of the subject matter according to the present disclosure relates to a method for controlling a control surface of an aircraft, the method including actuating a first actuator and a second actuator with a controller so as to pivot the control surface relative to the airframe about a longitudinal axis of a torque member, where the torque member pivotally couples a control surface frame of the control surface to the airframe, and the first actuator and the second actuator are coupled to the torque member at respective opposite ends of the torque member for pivoting the control surface, sensing strain on the torque member with a force balance sensor disposed between the opposite ends of the torque member, the force balance sensor including a mechanical strain amplification system including a sensor torsion member, at least one strain sensor coupled to the sensor torsion member between a first end and a second end of the sensor torsion member, a first torsional stiffening member coupled to the first end of the sensor torsion member and the torque member, and a second torsional stiffening member coupled to the second end of the sensor torsion member and the torque member, and adjusting actuation of one or more of the first actuator and the second actuator, with the controller, based on mechanically increased strain sensed by the at least one sensor.

BRIEF DESCRIPTION OF THE DRAWINGS

Having thus described examples of the present disclosure in general terms, reference will now be made to the accompanying drawings, which are not necessarily drawn to scale, and wherein like reference characters designate the same or similar parts throughout the several views, and wherein:

DETAILED DESCRIPTION

Figure 1:
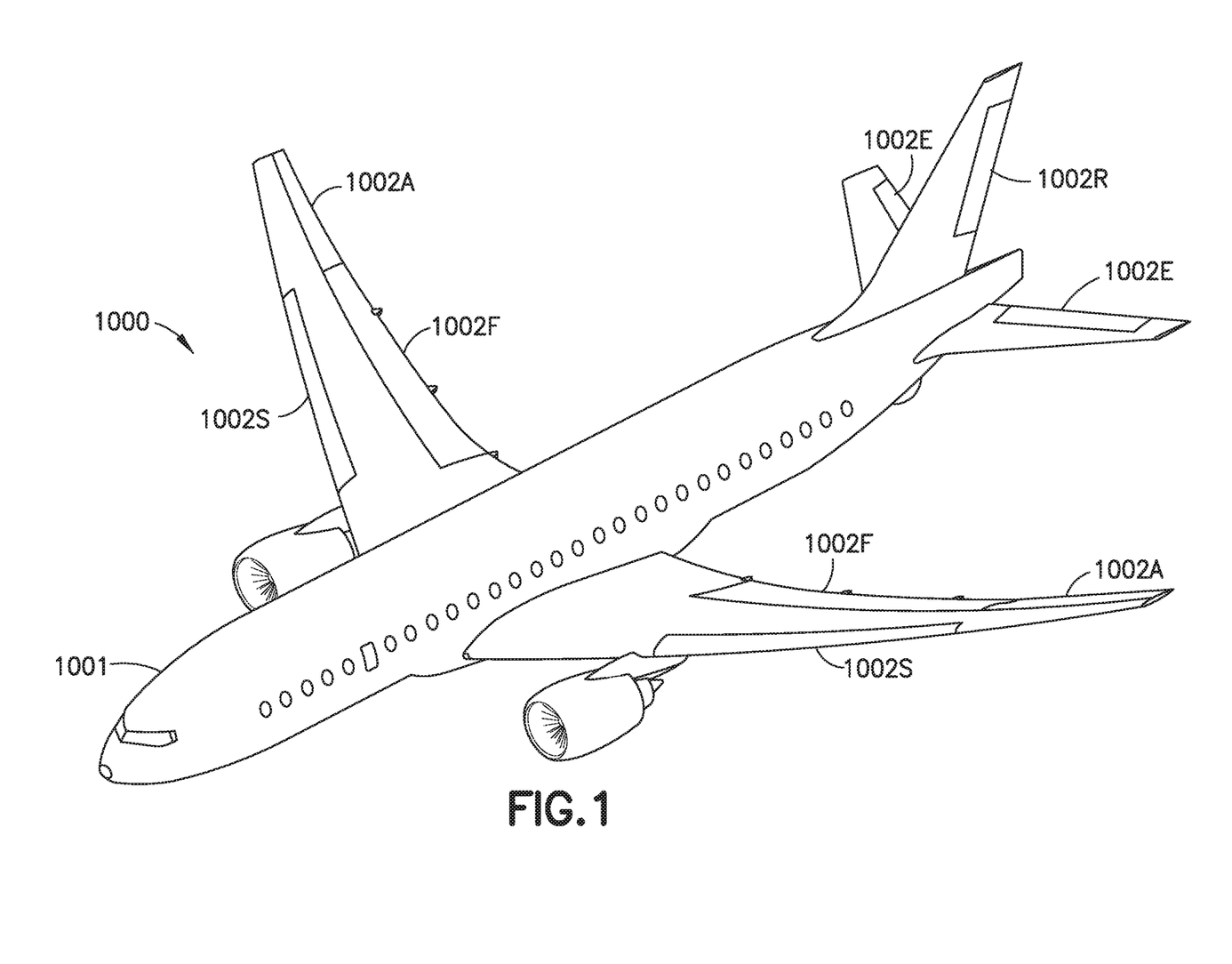
FIG. 1 is a schematic illustration of an aircraft in accordance with one or more aspects of the present disclosure.
Figure 2:
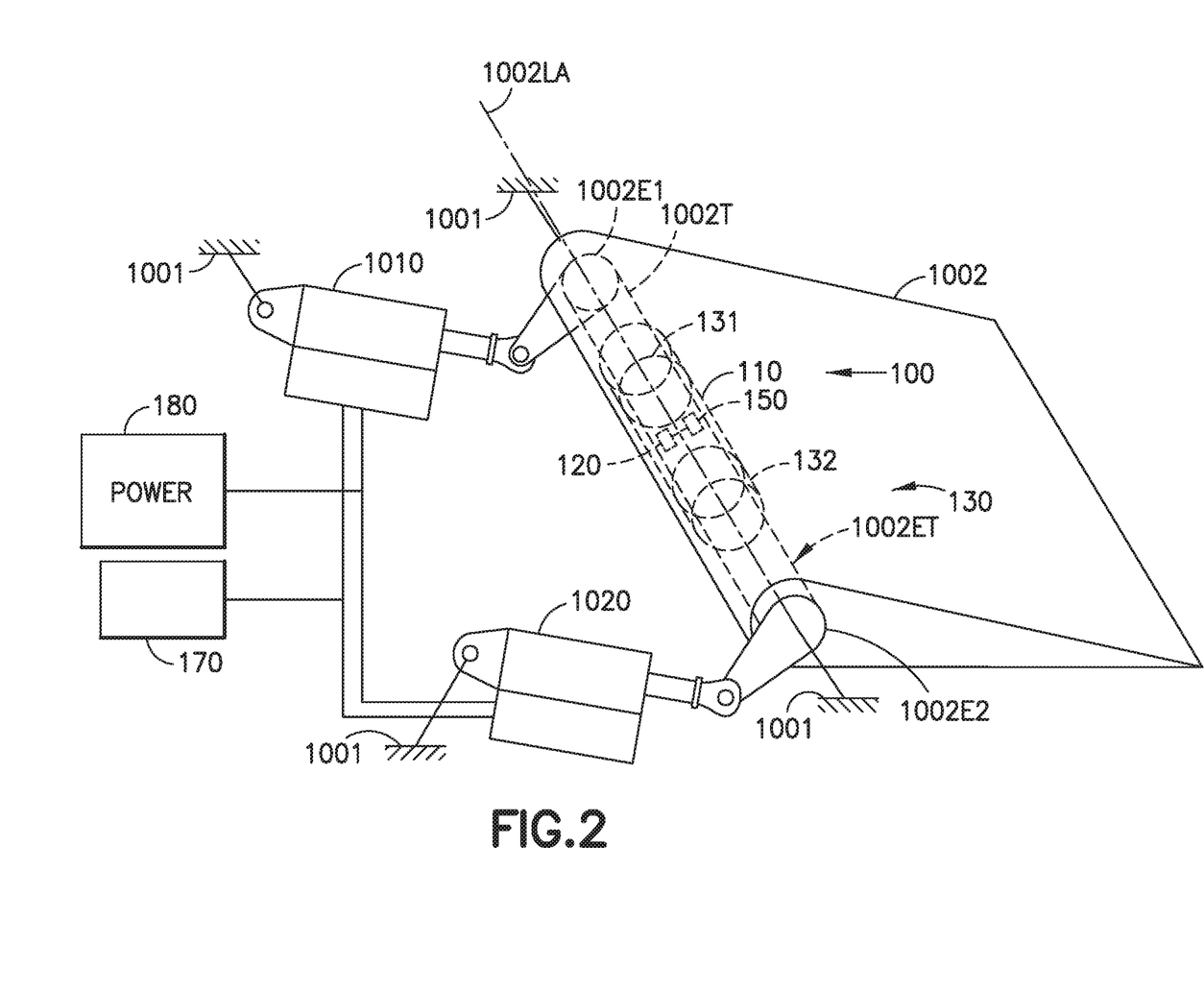
FIG. 2 is a top perspective view of a control surface and control surface actuation system in accordance with one or more aspects of the present disclosure.
Figure 3:
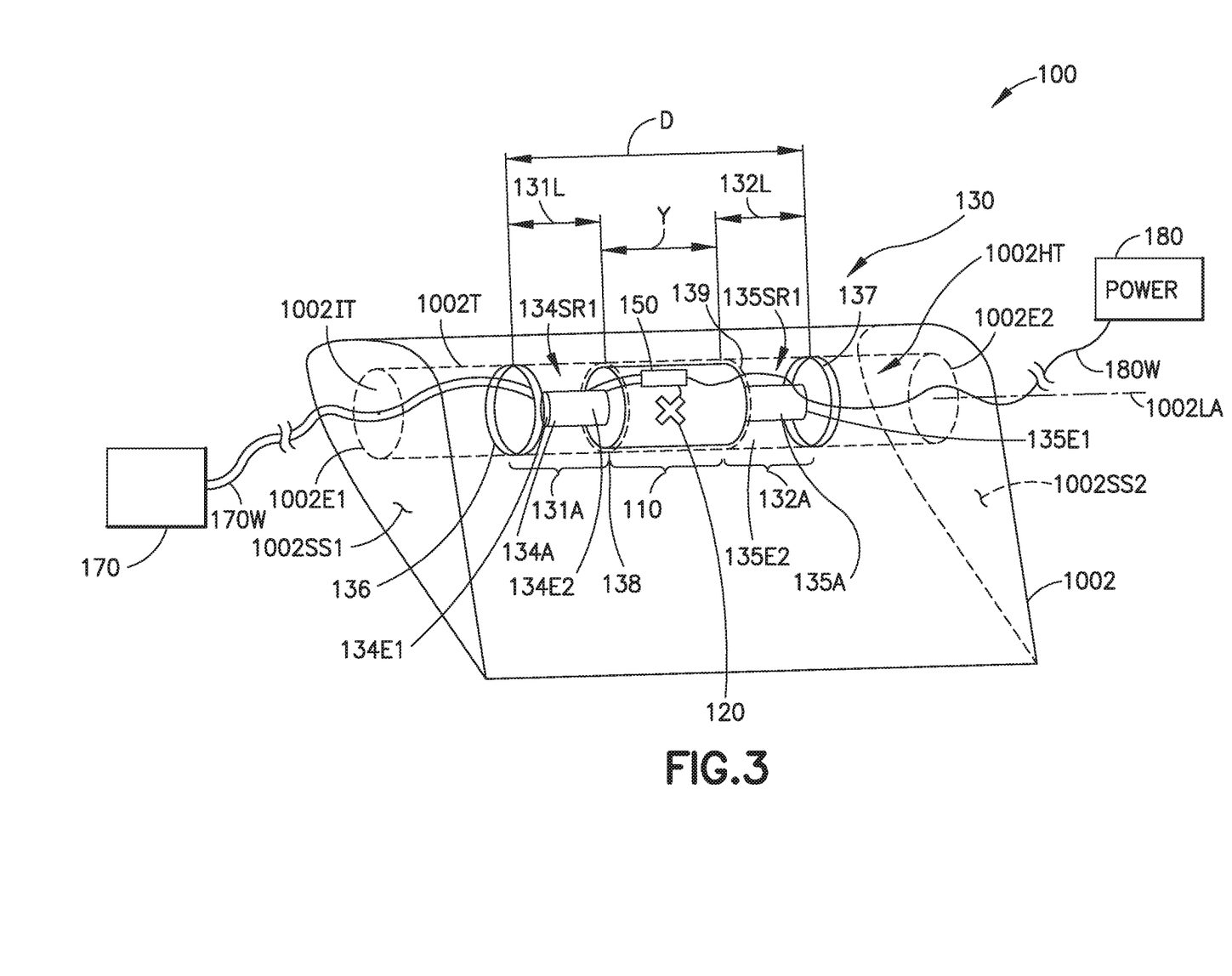
FIG. 3 is top perspective view of a force balance sensor in accordance with one or more aspects of the present disclosure.

Referring to FIGS. 1-3, the aspects of the present disclosure described herein provide a force balance sensor 100 which is integral to a flight control surface 1002 and can measure the differential torque (also referred to as force-fight) induced into the control surface 1002 due to, e.g., a difference in applied force at each actuator 1010, 1020. The force balance sensor 100 is configured such that the mechanical strain of a sensor torsion member 110 of the force balance sensor 100, is increased relative to a torque member 1002T of the flight control surface 1002 to bring an electrical signal (of at least one strain sensor 120 of the force balance sensor 100), proportional to the torque imbalance of the actuator controllers, above a lower noise threshold of the at least one strain sensor 120 by increasing the amplitude of the torsional strain on the sensor torsion member 110. The mechanical strain will be a function of the surface stiffness, and for the aircraft 1000, is too low for the at least one strain sensor 120 to measure due to electrical noise. The aspects of the present disclosure increase the mechanical strain of the sensor torsion member 110 to bring the electrical signal of the at least one strain sensor 120 above the lower noise threshold by mechanically increasing the amplitude of the torsional strain on the sensor torsion member 110.

As will be described herein, the force balance sensor 100 is configured to isolate and mechanically increase shear stresses, measure torque difference between, e.g., actuators 1010, 1020 across the control surface 1002, reduce complexity compared to other conventional methods (e.g., by employing fewer sensors and associated electronics), reduce the contribution of sensor error while measuring the torque differential between the actuators 1010, 1020, and reduce the number of sensors compared to conventional sensor configurations. Illustrative, non-exhaustive examples, which may or may not be claimed, of the subject matter according to the present disclosure are provided below.

Still referring to FIGS. 1-3, in one aspect, the force balance sensor 100 described herein for sensing mechanical strain across at least one control surface 1002 of an aircraft 1000 includes a mechanical strain amplification system 130 having a sensor torsion member 110, at least one strain sensor 120, a first torsional stiffening member 131A, 131B, 131C (generally referred to as first torsional stiffening member 131), a second torsional stiffening member 132A, 132B, 132C (generally referred to as second torsional stiffening member 132), a first torsion bar end coupling member 136, and a second torsion bar end coupling member 137.

Generally, torsional stiffness of the control surface 1002 is substantial such that any mechanical strain sensed by the at least one strain sensor 120 is likely to be located within the signal noise (i.e., a low amplitude signal) produced by the at least one strain sensor 120. In order for the signal produced by the at least one strain sensor 120 to be usable, the mechanical strain amplification system 130 is configured to mechanically increase the signals produced by the at least one strain sensor 120 so that the sensor signals are above the noise threshold of the at least one strain sensor 120.

The force balance sensor 100 is configured so that the at least one strain sensor 120 senses torsional deflection of the sensor torsion member 110 of the mechanical strain amplification system 130, coupled to a torque member 1002T of a control surface 1002. The mechanical strain amplification system 130 increases the signal sensed by the at least one strain sensor 120 to an accessible level above the noise threshold (i.e., a level above the noise produced by the at least one strain sensor 120 so that the signal may be attained).

It is noted that although the force balance sensor 100 is described herein with respect to torsional deflection of a control surface 1002 of the aircraft 1000 (e.g., flaps 1002F, slats 1002S, ailerons 1002A, elevators 1002E, rudder 1002R, or any other suitable control surface), in other aspects the force balance sensor 100 may be used in any suitable industry, for example, maritime, automotive, aerospace, etc., where measurement of torsional deflection of a torsion member is desired. It is further noted that while the aircraft 1000 depicted in FIG. 1 is depicted as a fixed wing aircraft, in other aspects, the aircraft may be a rotary wing aircraft or any other suitable aircraft.

As illustrated in FIG. 2, a first actuator 1010 is coupled to the first end 1002E1 of the torque member 1002T. The first actuator 1010 is further coupled to the airframe 1001 in any suitable manner. A second actuator 1020 is coupled to the second end 1002E2 of the torque member 1002T. The second actuator 1020 is also coupled to the airframe 1001 in any suitable manner. Both the first and second actuators 1010, 1020 are configured to pivot (e.g., through extension and retraction of the actuators) the control surface 1002 about the longitudinal axis 1002LA of the torque member 1002T. The torque member 1002T forms a primary load path or strain path between the two actuators 1010, 1020.

In one aspect, the torque member 1002T is a hollow tube 1002HT (FIG. 3) having an interior 1002IT, where the mechanical strain amplification system 130 is disposed within the interior 1002IT of the hollow tube 1002HT. In other aspects, the mechanical strain amplification system 130 may be coupled to an exterior surface of the hollow tube 1002HT in a manner similar to that described herein with respect to FIGS. 4B and 4C. The hollow tube 1002HT may be coupled to the control surface 1002 in any suitable manner so that as the hollow tube 1002HT pivots about the longitudinal axis 1002LA, the control surface 1002 pivots with the hollow tube 1002HT as a single unit. In another aspect, the torque member 1002 is a solid rod 1002SR (i.e., no interior surface, FIG. 4B) having an exterior 1002ET, where the mechanical strain amplification system 130 is disposed on the exterior 1002ET of the solid rod 1002SR (FIGS. 4B and 4C). In one aspect, the torque member 1002T may be a combination of a solid rod and a hollow tube or any other suitable member having any suitable shape.

Still referring to FIGS. 2-4C, as noted above, the force balance sensor 100 generally includes the mechanical strain amplification system 130 having the sensor torsion member 110, the at least one strain sensor 120, the first torsional stiffening member 131, and the second torsional stiffening member 132. The mechanical strain amplification system 130 is disposed on or within the torque member 1002T and forms a secondary strain path between the first and second actuators 1010, 1020. The mechanical strain amplification system 130 generally has a lower stiffness than the torque member 1002T which forms the primary strain path.

The mechanical strain amplification system 130 extends a distance D along the longitudinal axis 1002LA of the torque member 1002T. In one aspect, the distance D may span the entire length of the torque member 1002T or span any suitable distance along the torque member 1002T to increase the stiffness of the torque member 1002T and increase strain in the sensor torsion member 110 as further described herein. The distance D may also generally be related to a material used for one or more of the sensor torsion member 110, the first/second torsional stiffening members 131, 132, and the control surface 1002.

In one aspect, the torsional stiffness of the torque member 1002T is increased by the mechanical strain amplification system 130 such that $kt = k1_{TM} + k2_{MSA}$, where kt is the total stiffness, $k1_{TM}$ is the torque member stiffness, and $k2_{MSA}$ is the stiffness of the mechanical strain amplification system 130. In one aspect, the sensor torsion member 110 forms a torsion bar or tube disposed on or within the torque member 1002T of the control surface 1002. The sensor torsion member 110 includes a first end 110E1 and a second end 110E2 spaced from one another along a mechanical strain amplification longitudinal axis 130LA of the mechanical strain amplification system 130, which may be coincident with the longitudinal axis 1002LA of the torque member 1002T. The first end 110E1 and the second end 110E2 are spaced a distance Y (FIG. 3) from one another spanning a length of, for example, the control surface 1002. The distance Y may span any suitable length of the control surface 1002. In one aspect, the distance Y may generally be related to a material used for one or more of the torque member 110, the first/second torsional stiffening members 131, 132, and the control surface 1002 (i.e., the material used may determine whether a larger or smaller sensor torsion member 110 and thus a larger or smaller distance Y is necessary to sense torsion on the torque member 1002T).

In one aspect, the sensor torsion member 110 is a hollow tube 110HT (FIGS. 4B and 4C) having an interior 110IT and an exterior 110ET, where the at least one strain sensor 120 is disposed on the exterior 110ET of the hollow tube 110HT. The hollow tube 110HT may be coupled to the control surface 1002 in any suitable manner so that as torque member 1002T twists, the hollow tube 110HT twists relative to the control surface 1002. In another aspect, the sensor torsion member 110 may be a solid rod 110SR (i.e., no interior surface) having an exterior 110ET, where the at least one strain sensor 120 is disposed on the exterior 110ET of the solid rod 110SR. In one aspect, the sensor torsion member 110 may be a combination of a solid rod and a hollow tube or any other suitable member having any suitable shape. The sensor torsion member 110 is configured to have a material stiffness that is substantially lower than the torque member 1002T, the first torsional stiffening member 131, and the second torsional stiffening member 132 as will be further described below.

Still referring to FIGS. 2-4C, the at least one strain sensor 120 is configured to sense strain exerted on the sensor torsion member 110 (e.g., twisting of the sensor torsion member 110) during, e.g., pivotal movement of the control surface 1002 caused by actuation of the first and second actuators 1010, 1020. In one aspect, the at least one strain sensor 120 is disposed within the torque member 1002T so that the torque member 1002T forms an electromagnetic shield for the at least one strain sensor 120 (i.e., the at least one strain sensor 120 is disposed within the torque member 1002T such that the torque member 1002T surrounds the at least one strain sensor 120 forming a Faraday cage to guard or protect the at least one strain sensor 120 against electromagnetic interference). In one aspect, the at least one strain sensor 120 may be disposed within the sensor torsion member 110, such as when the sensor torsion member 110 is coupled to the exterior of the torque member 1002T, so as to electromagnetically shield the at least one strain sensor 120.

In one aspect, the first torsional stiffening member 131 is coupled to the first end 110E1 of the sensor torsion member 110. The second torsional stiffening member 132 is coupled to the second end 110E2 of the sensor torsion member 110. In one aspect, the first torsional stiffening member 131 and the second torsional stiffening member 132 each extend over respective predetermined longitudinal lengths 131L, 132L (FIG. 3) of the torque member 1002T. The first and second torsional stiffening members 131, 132 are configured to increase a torsional stiffness of the torque member 1002T over a length of the mechanical amplification system 130. A material stiffness of each of the first and second torsional stiffening members 131, 132 is higher than a material stiffness of both the sensor torsion member 110 and the torque member 1002T, while the sensor torsion member 110 has a lower material stiffness compared to the torque member 1002T and the first and second torsional stiffening members 131, 132.

Each of the first and second torsional stiffening members 131, 132 having a higher material stiffness, compared to the sensor torsion member 110, increases the torsional stiffness of the sensor torsion member 110 over the respective predetermined longitudinal lengths 131L, 132L. Increased torsional stiffness over the respective predetermined longitudinal lengths 131L, 132L causes an increase in twisting of the sensor torsion member 110 coupled between the first and second torsional stiffening members 131, 132 (i.e., the higher material stiffness of the first and second torsional stiffening members 131, 132 reduces twisting of the mechanical strain amplification system 130 over the respective predetermined longitudinal lengths 131L, 132L so that any twisting that would occur over the respective predetermined longitudinal lengths 131L, 132L is transferred to the sensor torsion member 110 to mechanically increase the twisting in the sensor torsion member 110). The increase in twist of the sensor torsion member 110 correspondingly mechanically increases strain (i.e., increases the strain above the lower noise threshold of the at least one strain sensor 120) sensed by the at least one strain sensor 120.

Figure 4A:
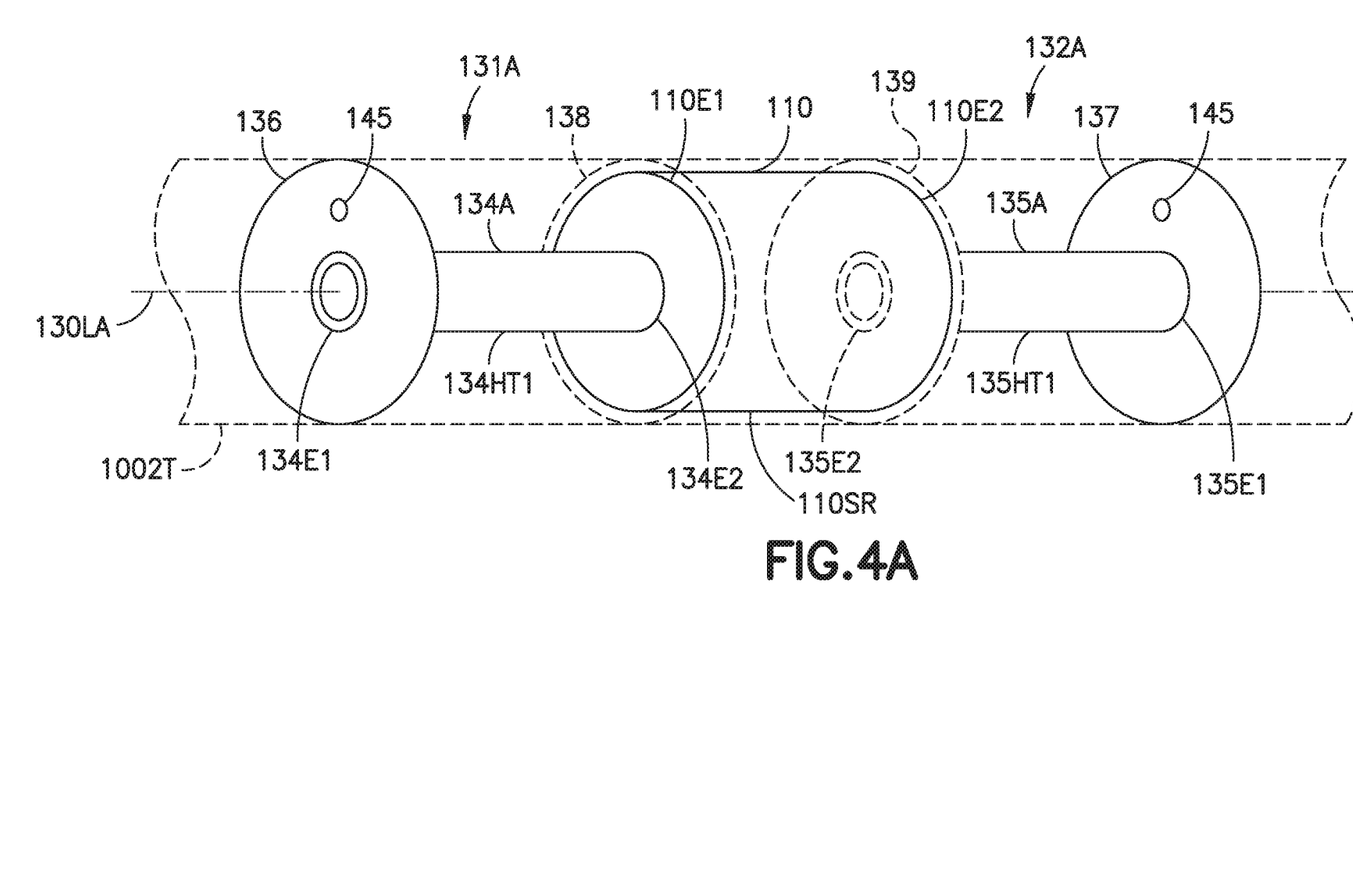
FIG. 4A is a perspective side view of a portion of the force balance sensor of FIG. 3 in accordance with one or more aspects of the present disclosure.
Figure 4B:
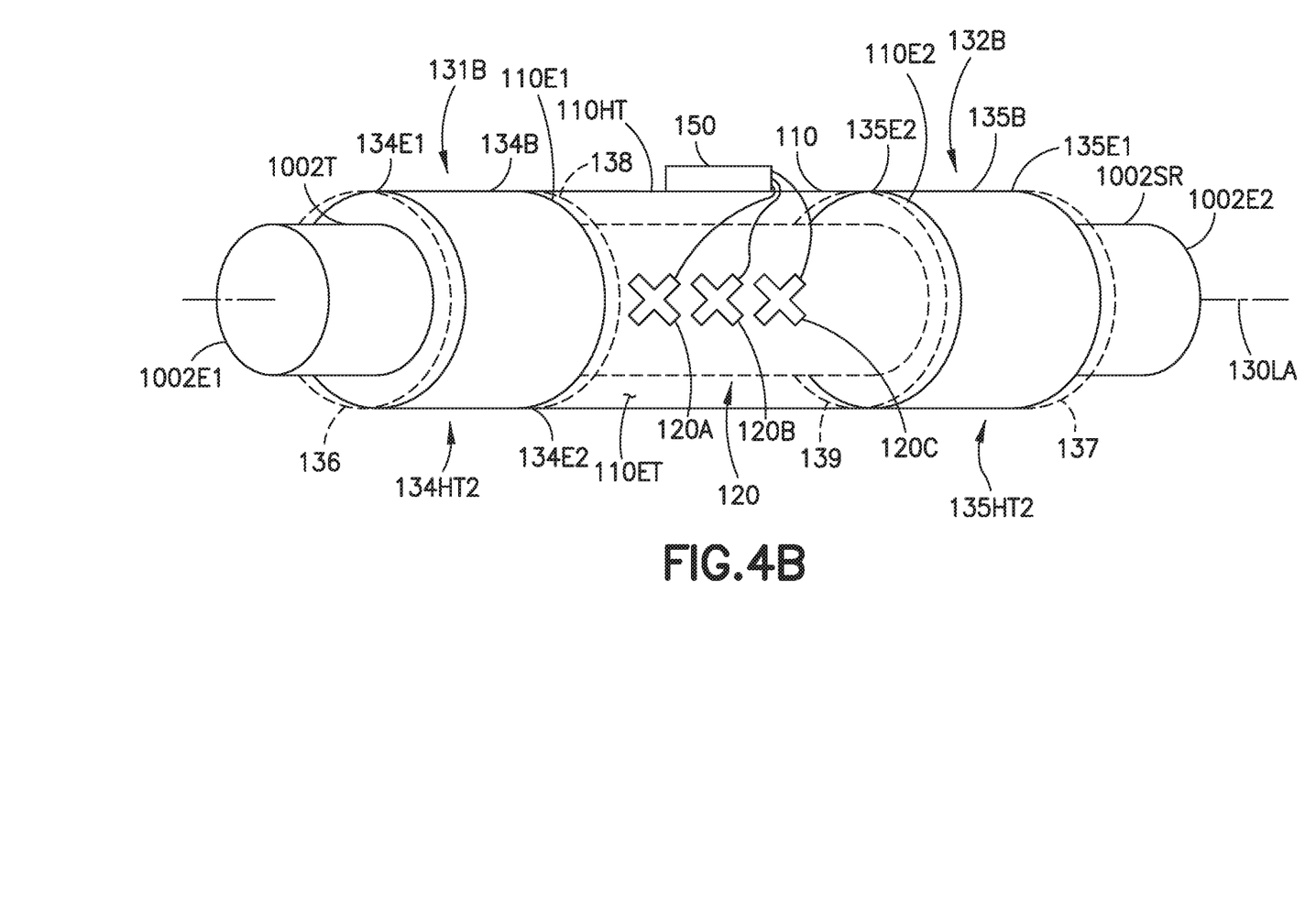
FIG. 4B is a perspective side view of a portion of the force balance sensor of FIG. 3 in accordance with one or more aspects of the present disclosure.
Figure 4C:
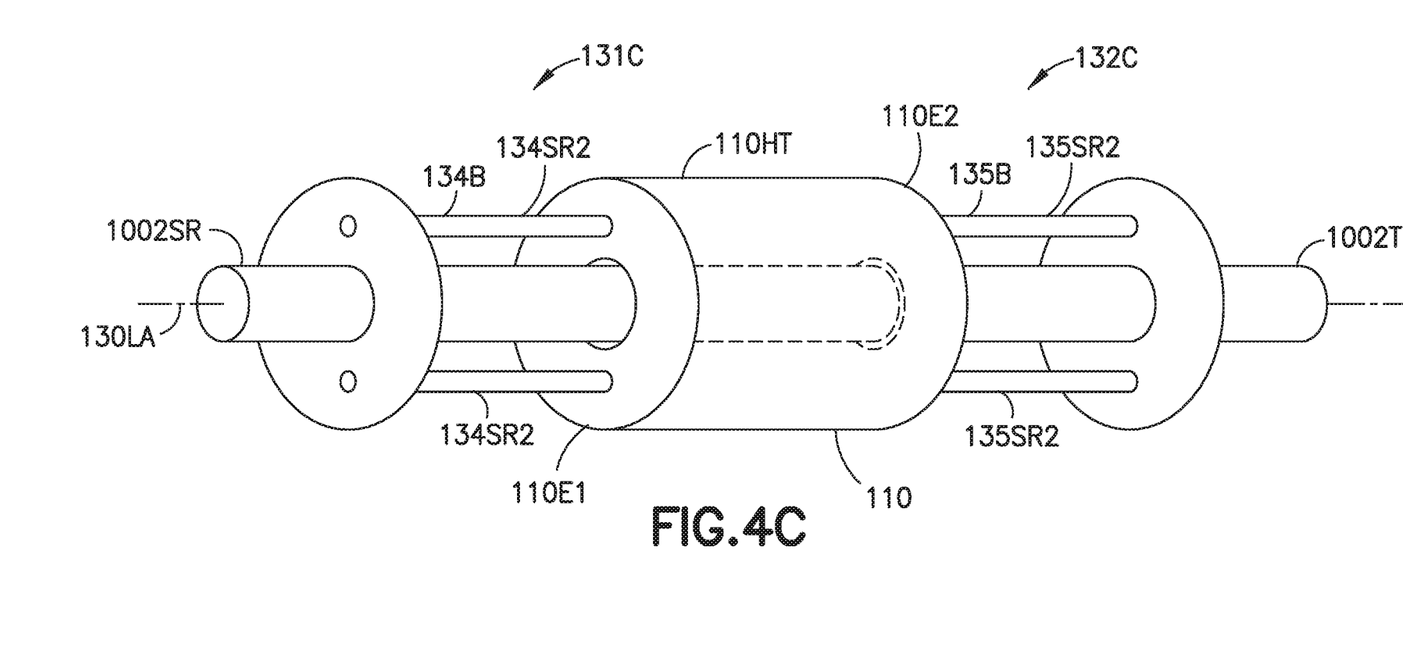
FIG. 4C is a perspective side view of a portion of the force balance sensor of FIG. 3 in accordance with one or more aspects of the present disclosure.

Referring to FIGS. 3 and 4A, the first and second torsional stiffening members 131, 132 will be described with respect to the first torsional stiffening member 131A shown in FIG. 4A however, it should be understood that the second torsional stiffening member is substantially similar and includes similar features. As noted above, the first torsional stiffening member 131A and the second torsional stiffening member 132A are coupled to the sensor torsion member 110, disposed within the interior 1002IT of the torque member 1002T. Each of the first and second torsional stiffening members 131A, 132A include a respective first and second torsion bar 134A, 135A. In one aspect, the first and second torsion bar 134A, 135A are a solid rod 134SR1, 135SR1 (see FIG. 3) or hollow tube 134HT1, 135HT1 (see FIG. 4A) that is disposed inside the torque member 1002T. Each of the first and second torsion bar 134A, 135A include a first torsion bar end 134E1, 135E1 and a second torsion bar end 134E2, 135E2 separated from each other along the mechanical strain amplification longitudinal axis 130LA. Each of the first torsion bar 134A and the second torsion bar 135A are configured so that the first and second torsional stiffening members 131, 132 have higher material stiffness than both the sensor torsion member 110 and the torque member 1002T. For example, each of the sensor torsion member 110 and the torque member 1002T may be formed by a material with a lower material stiffness than the first torsion bar 134A and the second torsion bar 135A.

In one aspect, a first torsion bar end coupling member 136, 137 is disposed at the first torsion bar end 134E1, 135E1 of each torsion bar 134A, 135A. The first torsion bar end coupling member 136, 137 is configured to fixedly couple the first torsion bar end 134E1, 135E1 to the torque member 1002T so that there is substantially no relative movement between the torque member 1002T and each of the first torsion bar 134A and the second torsion bar 135A.

In another aspect, as illustrated in FIGS. 4B and 4C, the first torsional stiffening member 131B, 131C and the second torsional stiffening member 132B, 132C are substantially similar to the first and second torsional stiffening members 131A, 132 however, in this aspect the first torsional stiffening member 131B, 131C and the second torsional stiffening member 132B, 132C are disposed on the exterior 1002ET of the torque member 1002T. The first and second torsional stiffening members 131B and 131C, 132B and 132C include respective first and second torsion bars 134B, 135B in the form of either one or more solid rod 134SR2, 135SR2 (FIG. 4C) or a hollow tube 134HT2, 135HT2 (FIG. 4B).

In one aspect, the mechanical strain amplification system 130 may further include at least one vibration isolators 138, 139. The vibration isolators 138, 139 may be disposed at respective ends 110E1, 110E2 of the sensor torsion member 110. The at least one vibration isolators 138, 139 are configured to isolate the sensor torsion member 110 disposed on or within the torque member 1002T from vibration of the torque member 1002T. The at least one vibration isolators 138, 139 absorb and damps vibration produced by the torque member 1002T such that vibration transfer from the torque member 1002T to the sensor torsion member 110 is limited or reduced.

Referring now to FIGS. 2, 3, and 4B, in one aspect, the force balance sensor 100 further includes at least one signal amplifier 150 coupled to the at least one strain sensor 120 and configured to electronically amplify the sensor signals produced by the at least one strain sensor 120. In one aspect, the force balance sensor 100 further includes the controller 170 coupled to the at least one strain sensor 120. The controller 170 includes non-transitory computer program code configured to determine a torsional displacement (i.e., twist) between the first end 110E1 and the second end 110E2 of the sensor torsion member 110 based on sensor signals received from the at least one strain sensor 120. The controller 170 is further configured to correct the torsional displacement via actuation of the first and second actuators 1010, 1020 to reduce twist.

In one aspect, the first torsion bar end coupling member 136, 137 of each of the first and second torsion bar 134A, 134B, 135A, 135B may include at least one aperture 145 (see FIG. 4A). The aperture 145 is configured for passing wires 170W, 180W therethrough. For example, electrical power wires 180W, such as for providing electrical power 180 to the at least one signal amplifier 150 and the at least one strain sensor 120, may pass through one or more of the first torsion bar end coupling member 136, 137 and the second torsion bar end coupling member 138, 139. Signal wires 170W, such as for providing the sensor signals from the at least one strain sensor 120 and the at least one signal amplifier 150 to the controller 170, may also pass through the first torsion bar end coupling member 136, 137. In one aspect, the power wires 180W and the signal wires 170W may be disposed on opposite sides of, at least the signal amplifier 150 so as to substantially prevent electromagnetic interference between the power wires 180W and the signal wires 170W. As an example, the power 180 is provided via the power wires 180W at the side 1002SS2 of the control surface 1002 while the sensor signals are transmitted via the wires 170W at the side 1002SS1. In another aspect, electrical power 180 to and sensor signals from the at least one strain sensor 120 and the at least one signal amplifier 150 may be provided in any suitable manner. For example, where the torque member 1002T is solid, the wires 170W, 180W may be passed to and from the at least one signal amplifier 150 and the at least one strain sensor 120 external to the torque member 1002T and the first and second torsional stiffening members 131B, 132B.

Figure 5:
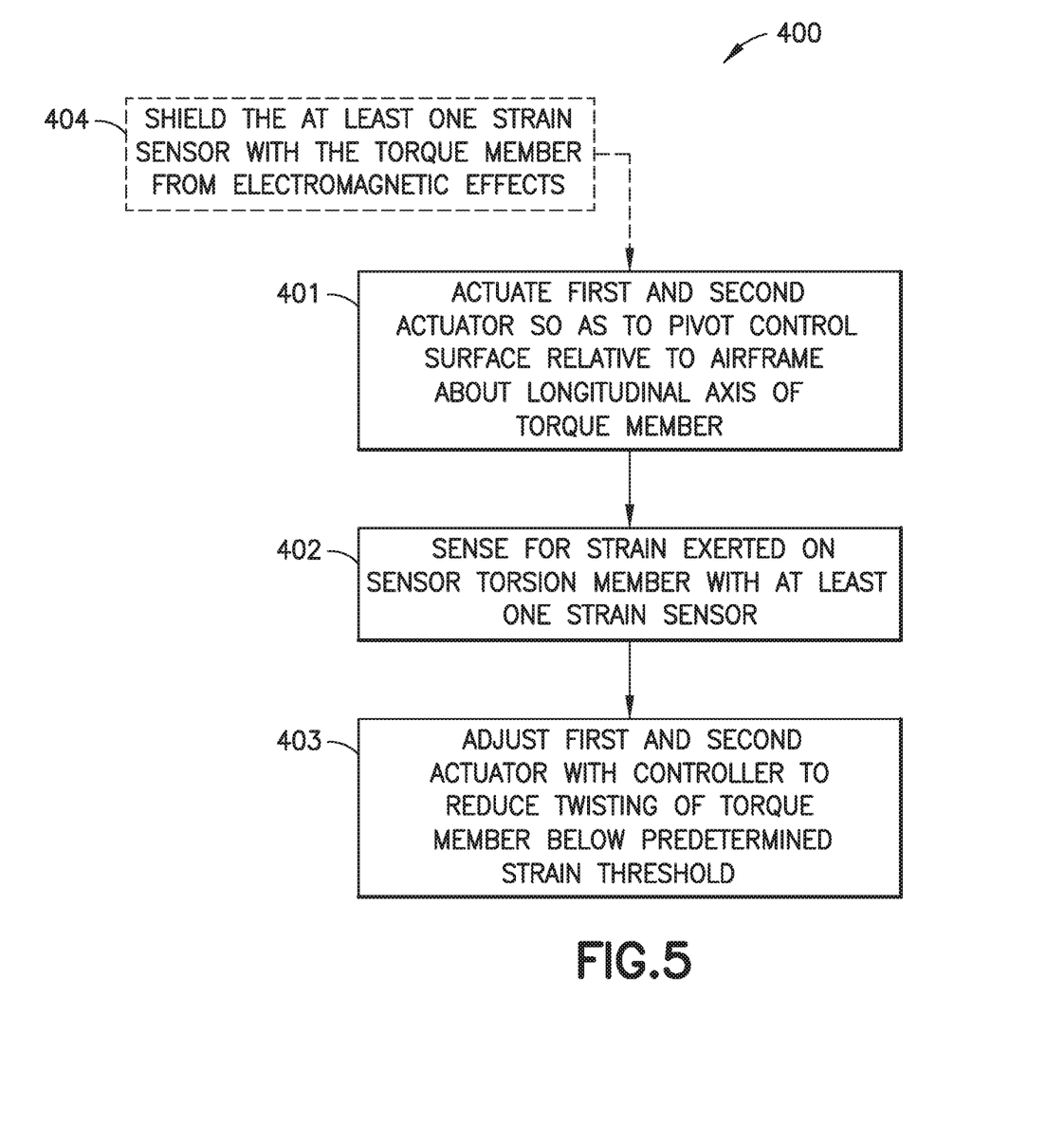
FIG. 5 is a method for controlling a control surface of an aircraft using the force balance sensor of FIG. 2 in accordance with one or more aspects of the present disclosure.

Referring now to FIG. 5, a method 400 for controlling the control surface 1002 of the aircraft 1000 using the force balance sensor 100 is illustrated. In one aspect, the first actuator 1010 and the second actuator 1020 are actuated by the controller 170 so as to pivot the control surface 1002 relative to the airframe 1001 about the longitudinal axis 1002LA of the torque member 1002T (FIG. 5, Block 401).

During and/or after the control surface 1002 pivots, the force balance sensor 100 senses strain exerted on the sensor torsion member 110 (FIG. 5, Block 402) with the at least one strain sensor 120 coupled to the sensor torsion member 110 between the first 110E1 and second ends 110E2. In one aspect, the first torsional stiffening member 131 and the second torsional stiffening member 132 increase a torsional stiffness of the torque member 1002T so that the twisting of the sensor torsion member 110 mechanically increases strain sensed by the at least one strain sensor 120.

In one aspect, the sensor signals, corresponding to the mechanically increased strain, sensed by the at least one strain sensor 120 are further amplified by at least one signal amplifier 150 and transmitted to the controller 170. Based on the mechanically increased strain sensed by the at least one sensor 120, the position of the first actuator 1010 and the second actuator 1020 may be adjusted with the controller 170 (FIG. 5, Block 403). Adjusting the position of the first and second actuators 1010, 1020 reduces twisting of the sensor torsion member 110, and thus the control surface 1002 to a level below a predetermined strain threshold.

The controller 170 is configured to receive signals from as many sensors as are implemented in the sensor torsion member 110. For example, if more than one sensor 120A, 120B, 120C (FIG. 4B), such as for triple redundancy, are installed and providing signals to the controller 170, the controller 170 is configured to determine which sensor signal or combination of sensor signals to use for balancing the force between the two actuators 1010, 1020. The determination of which sensor signal or combination of sensor signals to use may be performed by the controller 170 in any suitable manner, such as by taking an average of the sensor signals, discarding one or more sensor signals if the one or more sensor signals differs from other ones of the sensor signals by a predefined limit, etc. If one sensor signal differs from the others beyond the predefined limit, the controller 170 may be configured to notify an operator of the aircraft 1000 or other personnel that there may be anomalous sensor readings from the force balance sensor 100 for diagnostics and prognostics.

Once the selected signal(s) is applied by the controller 170 to correct the torsional difference between the two actuators 1010, 1020, the difference in torque embodied by the sensor signal decreases holding, all other disturbances constant in a closed-loop fashion (e.g., the controller 170 may substantially continuously adjust a position of one or more of the actuators 1010, 1020 until the sensor signal received by the controller 170 from the at least one strain sensor 120 (or the at least one signal amplifier 150) indicates that the difference in torque between the two actuators 1010, 1020 is within a predetermined acceptable range). The selected sensor signal(s) is provided to modify the position signals provided to each actuator 1010, 1020 to change the commanded position of one or more of the actuators 1010, 1020 to balance the force between the two actuators 1010, 1020. In one example, for maximum dynamic response, the signal would be halved and provided with opposite sign to affect both actuator position signals. For simplicity of integration, the entire signal amplitude could be used to modify the position command to only one actuator 1010, 1020. In both instances, the magnitude of the position command change may be bounded to prevent poor calibration, or some other issue from developing enough position authority to the force balance function to prevent certain failure modes from creating large surface position displacements beyond the nominal surface position required for flight control.

In one aspect, vibration of the sensor torsion member 110 is dampened with at least one vibration isolator 138, 139.

In one aspect, the torque member 1002T shields the at least one strain sensor 120 from electromagnetic effects (FIG. 5, Block 404).

Figure 6:
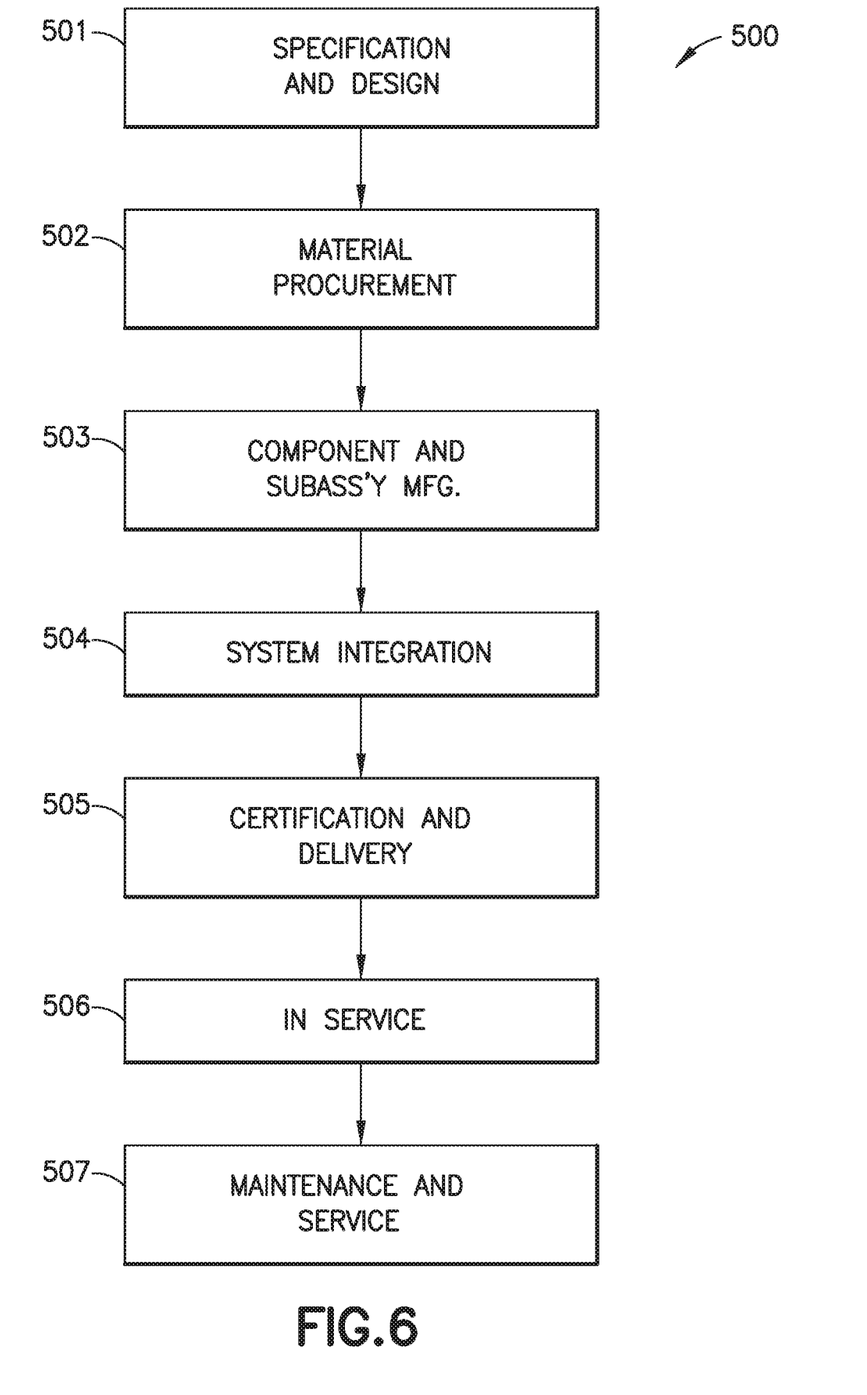
FIG. 6 is a flow chart of an aircraft production and service methodology.

Examples of the present disclosure may be described in the context of aircraft manufacturing and service method 500 as shown in FIG. 6. In other aspects, the examples of the present disclosure may be applied in any suitable industry, such as e.g., automotive, maritime, aerospace, etc. With respect to aircraft manufacturing, during pre-production, illustrative method 500 may include specification and design (block 501) of aircraft 1000 (FIG. 1) and material procurement (block 502). During production, component and subassembly manufacturing (block 503) and system integration (block 504) of aircraft 1000 may take place. Thereafter, aircraft 1000 may go through certification and delivery (block 505) to be placed in service (block 506). While in service, aircraft 1000 may be scheduled for routine maintenance and service (block 507). Routine maintenance and service may include modification, reconfiguration, refurbishment, etc. of one or more systems of aircraft 1000 which may include use of the force balance sensor 100 as described herein.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 500. For example, components or subassemblies corresponding to component and subassembly manufacturing (block 503) may be fabricated or manufactured in a manner similar to components or subassemblies produced while aircraft 1000 is in service (block 506). Also, one or more examples of the apparatus (es), method(s), or combination thereof may be utilized during production stages 503 and 504, for example, by substantially expediting assembly of or reducing the cost of aircraft 1000. Similarly, one or more examples of the apparatus or method realizations, or a combination thereof, may be utilized, for example and without limitation, while aircraft 1000 is in service (block 506) and/or during maintenance and service (block 507).

The following are provided in accordance with the aspects of the present disclosure:

A1. A force balance sensor including:
a mechanical strain amplification system including:
a sensor torsion member having a first end and a second end spaced from one another along a longitudinal axis of the sensor torsion member;
at least one strain sensor coupled to the sensor torsion member between the first and second ends;
a first torsional stiffening member coupled to the first end of the sensor torsion member; and
a second torsional stiffening member coupled to the second end of the sensor torsion member,
wherein the first torsional stiffening member and the second torsional stiffening member are coupled to a torque member.

A2. The paragraph of A1, wherein torque is transferred from the torque member to the sensor torsion member by the first and second torsional stiffening members so as to mechanically increase strain sensed by the at least one strain sensor.

A3. The paragraph of A1, wherein the first and second torsional stiffening members increase a torsional stiffness of the torque member over a length of the mechanical strain amplification system, where twisting of the sensor torsion member disposed between the first and second torsional stiffening members, due to differential torsional forces applied at opposite ends of the torque member, is increased relative to twisting of the torque member over the length of the mechanical amplification system so as to mechanically increase strain sensed by the at least one strain sensor.

A4. The paragraph of A1, wherein the torque member comprises a hollow tube having an interior, where one or more of the at least one strain sensor, the first torsional stiffening member, and the second torsional stiffening member are disposed within the interior.

A5. The paragraph of A1, wherein one or more of the at least one strain sensor, the first torsional stiffening member, and the second torsional stiffening member are disposed on an exterior of the torque member.

A6. The paragraph of A1, wherein each of the first torsional stiffening member and the second torsional stiffening member comprises:
a torsion bar having a first torsion bar end and a second torsion bar end separated from each other along a mechanical strain amplification system longitudinal axis; and
a first torsion bar end coupling member disposed at the first torsion bar end and being configured to fixedly couple the first torsion bar end to the torque member;
wherein the second torsion bar end is configured to fixedly couple to the sensor torsion member.

A7. The paragraph of A1, wherein a material stiffness of each of the first torsional stiffening member and the second torsional stiffening member is higher than a material stiffness of both the sensor torsion member and the torque member.

A8. The paragraph of A1, further comprising at least one signal amplifier coupled to the at least one strain sensor.

A9. The paragraph of A1, further comprising a controller coupled to the at least one strain sensor, the controller being configured to determine a torsional displacement between the first end and the second end of the sensor torsion member based on sensor signals received from the at least one strain sensor.

A10. The paragraph of A1, wherein strain sensed by the at least one strain sensor is mechanically increased so that the strain sensed by the at least one strain sensor effects a signal from the at least one strain sensor that is above a noise threshold of the at least one strain sensor.

A11. The paragraph of A1, wherein the at least one strain sensor is coupled to the sensor torsion member so that the torque member forms an electromagnetic shield for the at least one strain sensor.

A12. The paragraph of A1, wherein a torque member torsional stiffness is increased by the mechanical strain amplification system such that $kt=k1_{TM}+k2_{MSA}$, where kt is a total stiffness, $k1_{TM}$ is a torque member stiffness, and $k2_{MSA}$ is a stiffness of the mechanical strain amplification system.

B1. An aircraft comprising:
an airframe;
a control surface having a control surface frame pivotally coupled to the airframe with a torque member;
a first actuator coupled to the first end and being configured to pivot the control surface about the longitudinal axis;
a second actuator coupled to the second end and being configured to pivot the control surface about the longitudinal axis;
a force balance sensor including
a mechanical strain amplification system including
a sensor torsion member having a first end and a second end spaced from one another along a longitudinal axis of the sensor torsion member,
at least one strain sensor coupled to the sensor torsion member between the first and second ends,
a first torsional stiffening member coupled to the first end of the sensor torsion member, and
a second torsional stiffening member coupled to the second end of the sensor torsion member,
wherein the first torsional stiffening member and the second torsional stiffening member are coupled to the torque member of the control surface.

B2. The paragraph of B1, wherein the torque member comprises a hollow tube having an interior, where one or more of the at least one strain sensor, the first torsional stiffening member, and the second torsional stiffening member are disposed within the interior.

B3. The paragraph of B1, wherein one or more of the at least one strain sensor, the first torsional stiffening member, and the second torsional stiffening member are disposed on an exterior of the torque member.

B4. The paragraph of B1, wherein each of the first torsional stiffening member and the second torsional stiffening member comprises:
a torsion bar having a first torsion bar end and a second torsion bar end separated from each other along the longitudinal axis of the sensor torsion member; and
a first torsion bar end coupling member disposed at the first torsion bar end and being configured to fixedly couple the first torsion bar end to the torque member;
wherein the second torsion bar end is configured to fixedly couple to the sensor torsion member.

B5. The paragraph of B1, wherein a material stiffness of each of the first torsional stiffening member and the second torsional stiffening member is higher than a material stiffness of both the sensor torsion member and the torque member.

B6. The paragraph of B1, further comprising at least one signal amplifier coupled to the at least one strain sensor.

B7. The paragraph of B1, further comprising a controller coupled to the at least one strain sensor, the first actuator, and the second actuator, the controller being configured to:
determine a torsional displacement between the first end and the second end of the sensor torsion member based on sensor signals received from the at least one strain sensor; and
actuate one or more of the first actuator and the second actuator so that the twisting of the torque member is reduced and the sensor signals received from the at least one strain sensor are below a predetermined strain threshold.

B8. The paragraph of B1, wherein strain sensed by the at least one strain sensor is mechanically increased so that the strain sensed by the at least one strain sensor effects a signal from the at least one strain sensor that is above a noise threshold of the at least one strain sensor.

B9. The paragraph of B1, wherein the at least one strain sensor is coupled to the sensor torsion member so that the torque member forms an electromagnetic shield for the at least one strain sensor.

B10. The paragraph of B1, wherein a torque member torsional stiffness is increased by the mechanical strain amplification system such that $kt=k1_{TM}+k2_{MSA}$, where kt is a total stiffness, $k1_{TM}$ is a torque member stiffness, and $k2_{MSA}$ is a stiffness of the mechanical strain amplification system.

B11. The paragraph of B1, further comprising:
a controller coupled to the at least one strain sensor through a first coupling; and
a power source coupled to the at least one strain sensor through a second coupling, where the first coupling extends through the first end of the torque member and the second coupling extends through the second end of the torque member so as to mitigate electromagnetic effects on a sensor signal generated by the at least one strain sensor.

C1. A method for controlling a control surface of an aircraft, the method comprising:
actuating a first actuator and a second actuator with a controller so as to pivot the control surface relative to the airframe about a longitudinal axis of a torque member, where
the torque member pivotally couples a control surface frame of the control surface to the airframe, and
the first actuator and the second actuator are coupled to the torque member at respective opposite ends of the torque member for pivoting the control surface;
sensing strain on the torque member with a force balance sensor disposed between the opposite ends of the torque member, the force balance sensor including a mechanical strain amplification system including a sensor torsion member, at least one strain sensor coupled to the sensor torsion member between a first end and a second end of the sensor torsion member, a first torsional stiffening member coupled to the first end of the sensor torsion member and the torque member, and a second torsional stiffening member coupled to the second end of the sensor torsion member and the torque member; and
adjusting actuation of one or more of the first actuator and the second actuator, with the controller, based on mechanically increased strain sensed by the at least one sensor.

C2. The paragraph of C1, where the first torsional stiffening member and the second torsional stiffening member extend over respective predetermined longitudinal lengths of the mechanical strain amplification system and increase a torsional stiffness of the torque member over the respective predetermined lengths so that the twisting of the sensor torsion member disposed between the first torsional stiffening member and the second torsional stiffening member, due to differential torsional forces applied at the first end and second end of the sensor torsion member by the first actuator and the second actuator, is increased relative to twisting of the torque member over the length of the mechanical strain amplification system so as to mechanically increase strain sensed by the at least one strain sensor.

C3. The paragraph of C1, wherein a material stiffness of each of the first torsional stiffening member and the second torsional stiffening member is higher than a material stiffness of both the sensor torsion member and the torque member.

C4. The paragraph of C1, wherein the sensor signals, corresponding to the mechanically increased strain, sensed by the at least one sensor are amplified by at least one signal amplifier for transmission to the controller.

C5. The paragraph of C1, wherein strain sensed by the at least one strain sensor is mechanically increased so that the strain sensed by the at least one strain sensor effects the sensor signals from the at least one strain sensor having a signal amplitude that is above a noise threshold of the at least one strain sensor.

C6. The paragraph of C1, further comprising shielding, with the torque member, the at least one strain sensor from electromagnetic effects.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A force balance sensor comprising:
   a mechanical strain amplification system including
      a sensor torsion member having a first end and a second end spaced from one another along a longitudinal axis of the sensor torsion member;
      at least one strain sensor coupled to the sensor torsion member between the first and second ends;
      a first torsional stiffening member coupled to the first end of the sensor torsion member; and
      a second torsional stiffening member coupled to the second end of the sensor torsion member,
   wherein:
      the first torsional stiffening member and the second torsional stiffening member are coupled to a torque member so that both of the sensor torsion member and the torque member extend between and are couple to each the first torsional stiffening member and the second torsional stiffening member to effect torque transfer between the first torsional stiffening member and the second torsional stiffening member; and
      each of the first torsional stiffening member and the second torsional stiffening member are configured to transfer torque from the torque member to a respective end of the sensor torsion member.

2. The force balance sensor of claim 1, wherein torque is transferred from the torque member to the sensor torsion member by the first and second torsional stiffening members so as to mechanically increase strain sensed by the at least one strain sensor.

3. The force balance sensor of claim 1, wherein the first and second torsional stiffening members increase a torsional stiffness of the torque member over a length of the mechanical strain amplification system, where twisting of the sensor torsion member disposed between the first and second torsional stiffening members, due to differential torsional forces applied at opposite ends of the torque member, is increased relative to twisting of the torque member over the length of the mechanical amplification system so as to mechanically increase strain sensed by the at least one strain sensor.

4. The force balance sensor of claim 1, wherein each of the first torsional stiffening member and the second torsional stiffening member comprises:
   a torsion bar having a first torsion bar end and a second torsion bar end separated from each other along a mechanical strain amplification system longitudinal axis; and
   a first torsion bar end coupling member is disposed at the first torsion bar end and is configured to fixedly couple the first torsion bar end to the torque member;
   wherein the second torsion bar end is configured to fixedly couple to the sensor torsion member.

5. The force balance sensor of claim 1, wherein a material stiffness of each of the first torsional stiffening member and the second torsional stiffening member is higher than a material stiffness of both the sensor torsion member and the torque member.

6. The force balance sensor of claim 1, further comprising at least one signal amplifier coupled to the at least one strain sensor.

7. The force balance sensor of claim 1, further comprising a controller coupled to the at least one strain sensor, the controller is configured to determine a torsional displacement between the first end and the second end of the sensor torsion member based on sensor signals received from the at least one strain sensor.

8. The force balance sensor of claim 1, wherein strain sensed by the at least one strain sensor is mechanically increased so that the strain sensed by the at least one strain sensor effects a signal from the at least one strain sensor that is above a noise threshold of the at least one strain sensor.

9. The force balance sensor of claim 1, wherein the at least one strain sensor is coupled to the sensor torsion member so that the torque member forms an electromagnetic shield for the at least one strain sensor.

10. An aircraft comprising:
    an airframe;
    a control surface having a control surface frame pivotally coupled to the airframe with a torque member;
    a first actuator is coupled to a first end of the torque member and is configured to pivot the control surface about a longitudinal axis of the torque member;
    a second actuator is coupled to a second end of the torque member and is configured to pivot the control surface about the longitudinal axis;
    a force balance sensor including
       a mechanical strain amplification system including
          a sensor torsion member having a first end and a second end spaced from one another along a longitudinal axis of the sensor torsion member,
          at least one strain sensor coupled to the sensor torsion member between the first and second ends,
          a first torsional stiffening member coupled to the first end of the sensor torsion member, and
          a second torsional stiffening member coupled to the second end of the sensor torsion member,
       wherein the first torsional stiffening member and the second torsional stiffening member are coupled to the torque member of the control surface.

11. The aircraft of claim 10, wherein torque is transferred from the torque member to the sensor torsion member by the first and second torsional stiffening members so as to mechanically increase strain sensed by the at least one strain sensor.

12. The aircraft of claim 10, wherein the first and second torsional stiffening members increase a torsional stiffness of the torque member over a length of the mechanical strain amplification system, where twisting of the sensor torsion member disposed between the first and second torsional stiffening members, due to differential torsional forces applied at opposite ends of the torque member, is increased relative to twisting of the torque member over the length of the mechanical amplification system so as to mechanically increase strain sensed by the at least one strain sensor.

13. The aircraft of claim 10, wherein one or more of the sensor torsion member, the at least one strain sensor, the first torsional stiffening member, and the second torsional stiffening member are disposed within an interior or on an exterior of the torque member.

14. The aircraft of claim 10, wherein each of the first torsional stiffening member and the second torsional stiffening member comprises:
   a torsion bar having a first torsion bar end and a second torsion bar end separated from each other along the longitudinal axis of the sensor torsion member; and
   a first torsion bar end coupling member is disposed at the first torsion bar end and is configured to fixedly couple the first torsion bar end to the torque member;
   wherein the second torsion bar end is configured to fixedly couple to the sensor torsion member.

15. The aircraft of claim 10, further comprising a controller coupled to the at least one strain sensor, the first actuator, and the second actuator, the controller is configured to:
   determine a torsional displacement between the first end and the second end of the sensor torsion member based on sensor signals received from the at least one strain sensor; and
   actuate one or more of the first actuator and the second actuator so that the twisting of the torque member is reduced and the sensor signals received from the at least one strain sensor are below a predetermined strain threshold.

16. The aircraft of claim 10, wherein a torque member torsional stiffness is increased by the mechanical strain amplification system such that $kt = k1_{TM} + k2_{MSA}$, where kt is a total stiffness, $k1_{TM}$ is a torque member stiffness, and $k2_{MSA}$ is a stiffness of the mechanical strain amplification system.

17. The aircraft of claim 10, further comprising:
   a controller coupled to the at least one strain sensor through a first coupling; and
   a power source coupled to the at least one strain sensor through a second coupling, where the first coupling extends through the first end of the torque member and the second coupling extends through the second end of the torque member so as to mitigate electromagnetic effects on a sensor signal generated by the at least one strain sensor.

18. A method for controlling a control surface of an aircraft, the method comprising:
   actuating a first actuator and a second actuator with a controller so as to pivot the control surface relative to the airframe about a longitudinal axis of a torque member, where
      the torque member pivotally couples a control surface frame of the control surface to the airframe, and
      the first actuator and the second actuator are coupled to the torque member at respective opposite ends of the torque member for pivoting the control surface;
   sensing strain on the torque member with a force balance sensor as claimed in claim 1, where the force balance sensor is disposed between the opposite ends of the torque member; and
   adjusting actuation of one or more of the first actuator and the second actuator, with the controller, based on mechanically increased strain sensed by the at least one sensor.

19. The method of claim 18, where the first torsional stiffening member and the second torsional stiffening member extend over respective predetermined longitudinal lengths of the mechanical strain amplification system and increase a torsional stiffness of the torque member over the respective predetermined lengths so that the twisting of the sensor torsion member disposed between the first torsional stiffening member and the second torsional stiffening member, due to differential torsional forces applied at the first end and second end of the sensor torsion member by the first actuator and the second actuator, is increased relative to twisting of the torque member over the length of the mechanical strain amplification system so as to mechanically increase strain sensed by the at least one strain sensor.

20. The method of claim 18, wherein the sensor signals, corresponding to the mechanically increased strain, sensed by the at least one sensor are amplified by at least one signal amplifier for transmission to the controller.

21. The method of claim 18, wherein strain sensed by the at least one strain sensor is mechanically increased so that the strain sensed by the at least one strain sensor effects the sensor signals from the at least one strain sensor having a signal amplitude that is above a noise threshold of the at least one strain sensor.

22. The method of claim 18, further comprising shielding, with the torque member, the at least one strain sensor from electromagnetic effects.

* * * * *

UNITED STATES PATENT AND TRADEMARK OFFICE
CERTIFICATE OF CORRECTION

PATENT NO. : 10,948,365 B2
APPLICATION NO. : 15/881237
DATED : March 16, 2021
INVENTOR(S) : Fox et al.

Page 1 of 1

It is certified that error appears in the above-identified patent and that said Letters Patent is hereby corrected as shown below:

In the Claims

Column 15, Claim 1, Line 43, "couple" should be "coupled".

Column 15, Claim 1, Line 43, after "each" should be "of".

Signed and Sealed this
Twenty-first Day of February, 2023

*Katherine Kelly Vidal*

Katherine Kelly Vidal
*Director of the United States Patent and Trademark Office*